April 23, 1963 J. A. TOTTEN 3,086,446
COFFEE BREWING APPARATUS
Filed Oct. 6, 1960 2 Sheets-Sheet 1

Inventor
John A. Totten
Dawson, Tilton, Fallon & Lungmus
Attorneys

April 23, 1963  J. A. TOTTEN  3,086,446
COFFEE BREWING APPARATUS
Filed Oct. 6, 1960  2 Sheets-Sheet 2
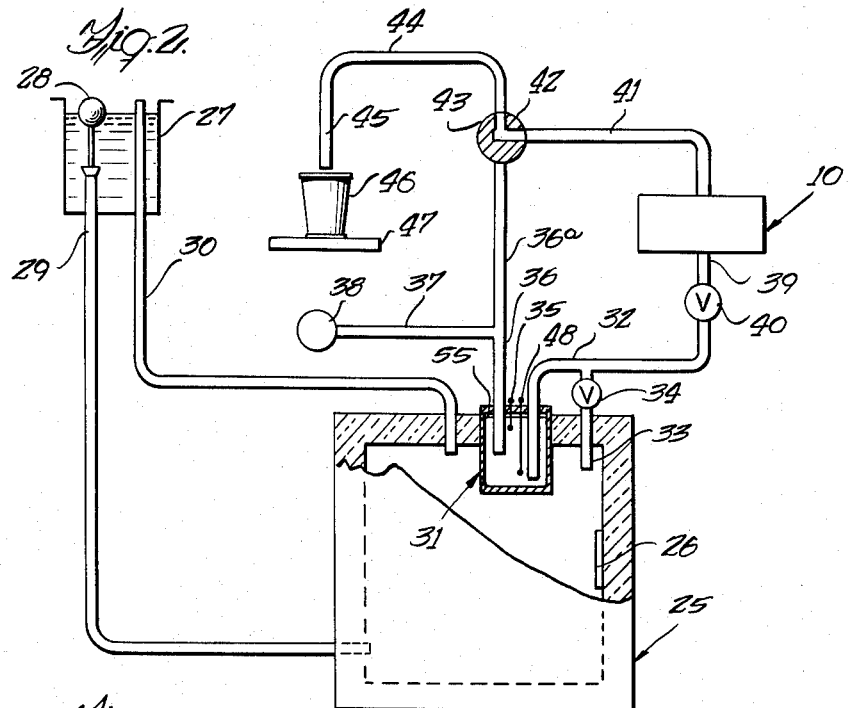
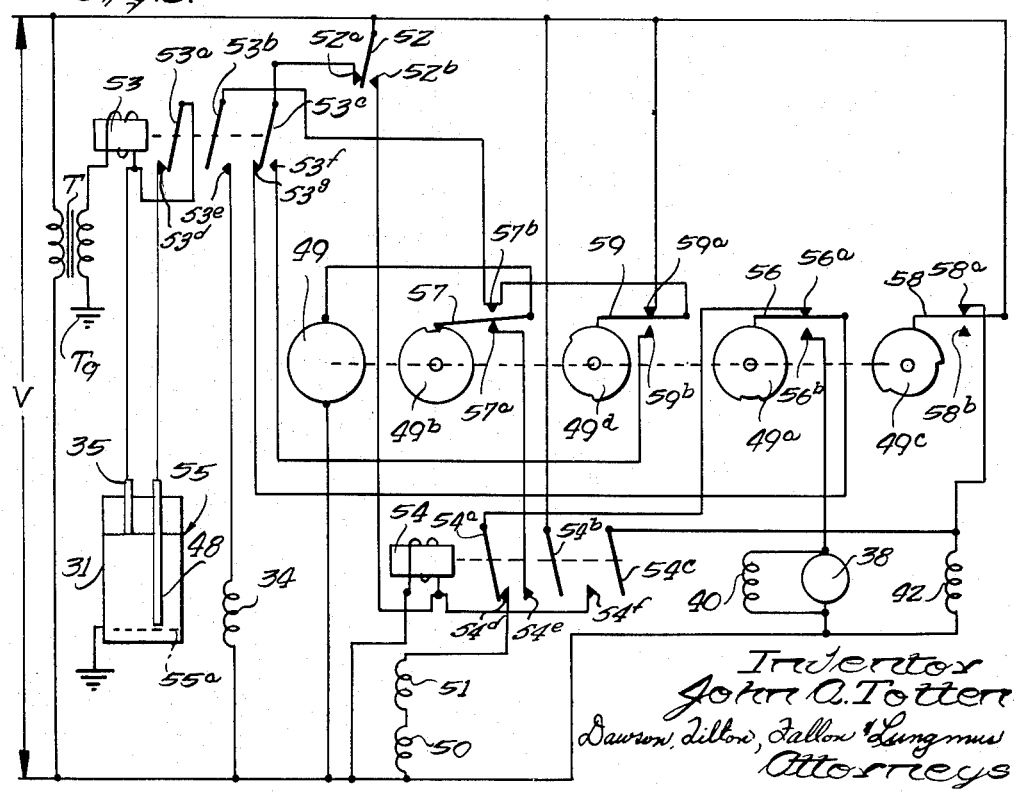

United States Patent Office 3,086,446
Patented Apr. 23, 1963

3,086,446
COFFEE BREWING APPARATUS
John A. Totten, Hammond, Ind., assignor, by mesne assignments, to Rock-Ola Manufacturing Corporation, Chicago, Ill., a corporation of Delaware
Filed Oct. 6, 1960, Ser. No. 60,906
16 Claims. (Cl. 99—283)

This invention relates to coffee brewing apparatus and, more specifically, to coffee brewing apparatus adapted to sequentially brew single cup quantities of coffee.

This application is related to my Patent No. 2,931,288, issued April 5, 1960.

It has been found desirable to provide vending machines of a nature adapted to brew single cup quantities of coffee, i.e., about 160 cc. Thus, each vendee receives a cup of coffee complete with the highly pleasing aroma associated with freshly brewed coffee and with none of the bitterness that often attaches to coffee that has been brewed sometime previously. This aroma persists only a short time, a matter of minutes. The aroma, however, contributes materially to the sales appeal of vending machine coffee. In the past, this has had to be sacrificed in order to deliver cup quantities of coffee frequently. The brewing cycle was felt to be too long in a single cup brewer to make the installation of such a device feasible, for example, in an industrial plant installation vending several hundred cups of coffee daily. Those versed in this art, however did not lose sight of the sales appeal of the freshly brewed single cup and attempted a number of expedients in order to adapt the single cup brewer to high speed operation.

These expedients were uniformly unsuccessful and, in many instances, created additional problems. To obtain a faster brewing cycle, an expedient was employed that utilized finer ground coffee. This immediately necessitated the installation of a finer filter screen to keep the "fines," from being delivered to the cup. This then posed a problem of cleaning and worse, introduced a variable flow resistance into the system. When the resistance of the system varies from cup to cup and with the same time employed for each cup quantity to be brewed, there arise radical differences in the quality of the brewed coffee. Lack of uniformity from cup to cup is considered even worse than absence of aroma insofar as inducing patrons to utilize the vending machine. For example, a given cup might be strong to the point of being almost as distasteful as the bitter coffee resulting from standing which was a characteristic drawback of the multi-cup brewers previously employed.

It is therefore an object of this invention to provide an apparatus for sequentially producing single cup quantities of coffee that avoids the drawbacks and disadvantages outlined above. Still another object is to provide a single cup brewing apparatus in which a pressure fluid is used sequentially first to achieve brewing and thereafter to achieve purging of the brewed chamber. Still another object is to provide a single cup brewing apparatus in which a novel arrangement of hot water storage facilities is employed to uniformize the brewed coffee output. Yet another object is to provide single cup brewing apparatus in which a novel electro-mechanical control system is employed which renders the apparatus independent of timing devices and thus achieves the desirable uniformity of quality from cup to cup while also retaining the advantageous freshly-brewed coffee aroma. Other objects and advantages of this invention may be seen in the details of construction and operation set down in this specification.

Invention will be explained in conjunction with an illustrated embodiment in the accompanying drawing in which—

FIG. 2 is a schematic picturization, essentially in elevation, some of the operative elements of a vending machine, particularly those of FIG. 1; and FIG. 3 is a schematic wiring diagram of the control system of the coffee brewing apparatus.

Figure 1:
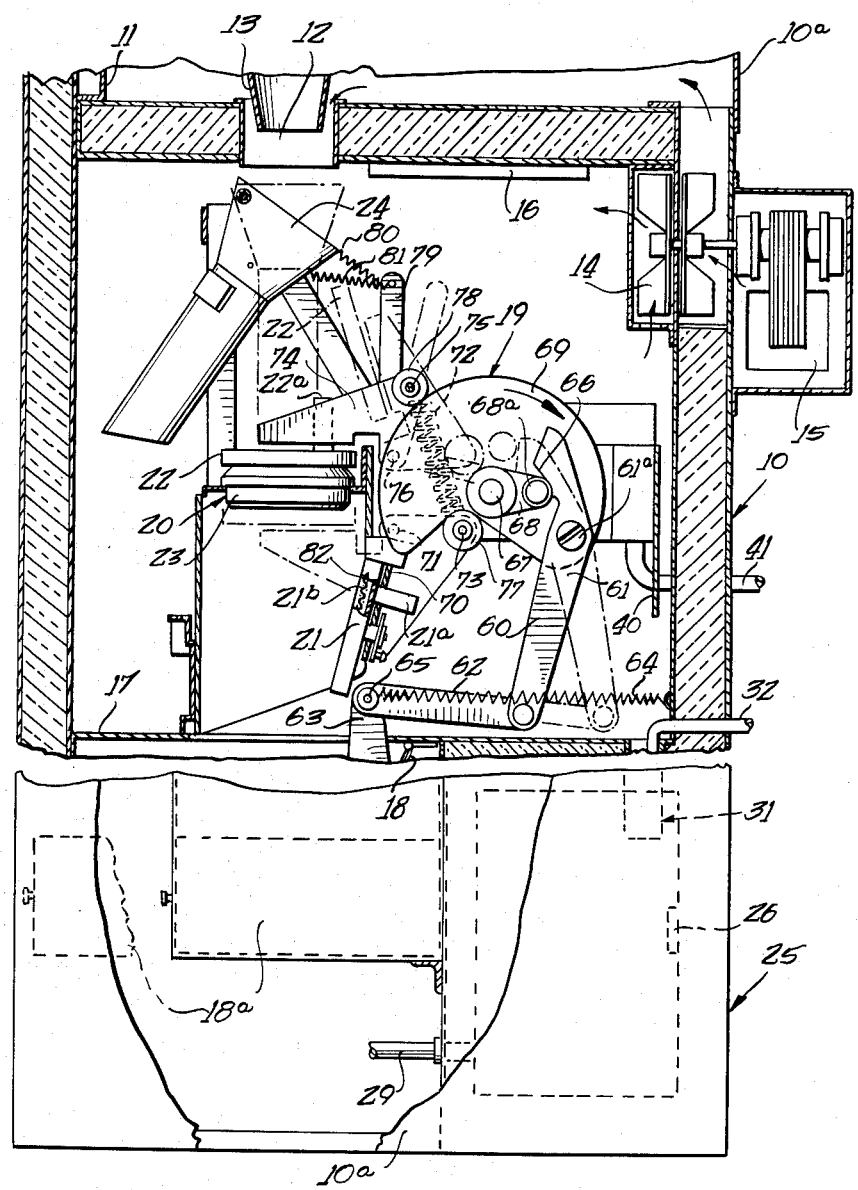
FIG. 1 is an elevational view, partially in section of the coffee brewing apparatus portion of a vending machine.

The upper portion of the drawing in FIG. 1 is essentially a reproduction of FIG. 2 of the drawing in my above-mentioned patent. Reference may be had to that patent for details of construction and operation not given herein.

In FIG. 1 of the drawing hereof, the numeral 10 designates generally an insulated enclosure for a coffee brewing unit. The unit 10 may be supported on the main frame 10a of the vending machine (not shown).

Mounted at top enclosure 10 is a hopper, generally designated 11, and which is adapted to hold solid particles of freshly ground coffee. The enclosure 10 is equipped with an aperture 12 which permits the introduction of the coffee particles into the enclosure 10.

The bottom of the hopper 11 is equipped with a funnel 13 which is aligned with and extends partially into the opening 12 of the enclosure 10.

The housing 10 is equipped with a blower 14 and motor 15 for the purpose of circulating air within the housing 10 as indicated by the arrows placed in FIG. 1 and for the purposes set forth in detail in my above-mentioned patent. Also, a heater 16 is provided within the enclosure 10 for the purpose of maintaining the interior at a temperature just below the boiling point of water, i.e. of the order of 205° F.

Enclosure 10 is equipped with a bottom wall 17 in which is mounted a pivotal door 18, the door 18 being opened at the end of each brewing cycle to permit gravity discharge of spent coffee grounds. The mechanism for opening the door 18 as well as manipulating portions of the brewing chamber is generally designated by the numeral 19, and the brewing chamber itself is generally designated by the numeral 20. The brewing chamber 20 is equipped with openable top and bottom closures, the bottom closure being designated by the numeral 21 and, in FIG. 1, is seen in its open condition in solid line and in its closed condition in broken line. It will be appreciated that the same conditions are available for the top closure which is designated 22 while the intermediate portion or casing of the brewing unit 20 is designated by the numeral 23.

The manipulating mechanism 19 is also operatively connected to a funnel 24 which is seen in solid line in its inoperative condition and in broken line in its position when it is operative to channel fresh coffee particles into the brewing chamber 20. When the funnel 24 is in this operating condition, the top closure 22 is open as is indicated by the broken line configuration also designated 22 in FIG. 1.

Briefly, the sequence of filling the brewing chamber 20 comprises closing the bottom closure 21, opening the top closure 22, pivoting the funnel 24 into the dotted line condition, discharging fresh coffee particles from the hopper 11 through the hopper funnel 13 into the casing 23 (as equipped with the bottom closure 21), and thereafter closing the top closure 22.

All of the structure housed within the enclosure 10 is schematically depicted by the block designated 10 in FIG. 2. Referring now to FIG. 2, the numeral 25 designates generally an insulated tank for the storage of heated water, the heating being achieved by a heating element 26. Water for the tank 25 is derived from a raw water reservoir 27 which may be equipped with a float valve 28. The reservoir 27 may be conveniently connected to a metropolitan water supply (not shown) and water from the reservoir 27 flows by gravity through the conduit 29 to the tank 25. The tank 25 is also connected to the reservoir 27 by means of an air vent 30 which also serves as a safety means to recirculate water from tank 25 to reservoir 27 in the event heating element 26 should malfunction and overheat or boil the water in tank 25.

Positioned within the upper central portion of the tank 25 is a water storage chamber generally designated 31. The chamber 31 may be insulated, although when substantially fully received within the tank 25 requires little if any insulation since it will be maintained at the temperature of the water within the tank 25. Further, being in the upper portion of the tank 25, it will be in contact with the hottest water. The tank 25 and the water storage chamber 31 are interconnected via a conduit having portions 32 and 33. The portion 32 extends substantially to the bottom of the storage chamber 31 while the branch 33 is equipped with the solenoid operated valve 34 (see also FIG. 3). Thus, when the valve 34 is opened, the water from the tank 25, under the influence of pressure exerted from the reservoir 27, flows upwardly through branch 33 and downwardly through branch 32 into the storage chamber 31. The amount of heated water delivered to the storage chamber 31 is regulated or controlled by the liquid level element 35 which may take the form of an electrode. The function of the control system will be described in greater detail hereinafter.

The water storage chamber 31 is a closed vessel except for the above-mentioned branch 32 and another branch conduit 36. The branch conduit 36 along with another branch conduit 37 connects the interior of the tank 31 with an air compressor 38. When pressurized fluid from the compressor 38 enters the storage chamber 31, heated water from the storage chamber 31 flows upwardly through the branch conduit 32 and thence to the brewing chamber within the enclosure 10 as by the branch conduit 39. The branch conduit 39 is equipped also with a solenoid operated valve 40 and when the valve 40 is opened, the valve 34 is closed.

When heated water flows upwardly through the enclosure 10, the brewing chamber having its top and bottom closures 22 and 21, respectively, closed at this point, it extracts the fresh coffee particles and thence flows via the conduit 41 to a three-way valve 42. At this time the valve element 43 of the valve 42 is positioned to communicate the conduit 41 to conduit 44 which terminates in a discharge head 45 positioned above a cup or other receptacle 46 mounted within a cup holder 47 provided as part of the frame 10a of the vending machine.

The over-all cycle of operation will now be described in greater detail and with specific reference to FIG. 3, which is a schematic wiring diagram. The wiring diagram, in addition to valves 34, 40 and 42 previously described and the electrode 35 and compressor 38, includes a long electrode 48 (see also FIG. 2) which is positioned slightly above the inlet to or bottom of branch 32. Interconnected into the control circuit is the motor 49 of the manipulating mechanism 19 and two solenoids 50 and 51 which are associated with the coin switch 52 provided as part of a conventional vending machine coin mechanism. Further, the electromechanical circuit includes an isolating transformer T and multi-contact relays 53 and 54.

Just before a coin is inserted into the coin mechanism (not shown) of the vending machine (also not shown), the electromechanical elements are in the condition seen in FIG. 3. Voltage is continuously applied to the circuit as at V and the voltage is applied to the primary of the transformer T. One side of the secondary of the transformer T is grounded as at $T_g$. The other side of the secondary of the transformer T is coupled to the relay 53, the other side of the relay 53 going to ground through (1) the electrode 35, (2) the water within the storage chamber 31 (the level of which is designated by the numeral 55 in FIGS. 2 and 3), and (3) the storage chamber 31 itself, as indicated schematically in FIG. 3. Thus, when the water level 55 contacts electrode 35, the ground circuit for relay 53 is completed, the relay 53 is energized, and this in turn repositions the three movable contacts thereof 53a, 53b, and 53c to the positions therefor shown in FIG. 3.

The contact 53a communicates with one side of the relay 53 via fixed contact 53d and also with the long or lower electrode 48. When the liquid level 55 drops below the lower end of the upper or short electrode 35, the relay 53 will remain energized by virtue of the electrical circuit established by contact 53a through the long electrode 48. This condition will continue to persist during the dispensing of water from the storage chamber 31 until the level 55 drops to the dotted line level 55a at which time ground circuit for the relay is disrupted and relay 53 is deenergized. As indicated above, the discharge of water from the storage chamber 31 is achieved through the application of compressed air from the compressor 38 and by virtue of the cooperation of the electrodes 35 and 48, the same volume of water will be dispensed from the storage chamber 31 for each operation of the mechanism irrespective of the liquid flow resistance introduced into the system, as by the fineness of grind of the coffee particles within the brew chamber 20.

The introduction of water into the storage chamber 31 to establish the level 55 is achieved at deenergization of the relay 53 through the circuit closing movement of the contact 53b with fixed contact 53e which is series-connected with the solenoid of the valve 34. During the refilling step, which will be described in greater detail hereinafter, the relay 53 is not energized since there is no complete circuit to ground through electrode 35, the water within chamber 31 and the casing of the latter. Thus, the normally closed contacts 53b and 53e directs current from the voltage source V to energize the solenoid of the valve 34, opening the latter, and permitting water to flow through the branch conduits 33 and 32 into the storage chamber 31. When sufficient water has entered the storage chamber 31 to raise the level to that designated 55 (FIG. 3), the circuit through the electrode 35, the water within chamber 31 and the casing of the chamber 31 is completed, again energizing the relay 53 and opening the contact 53b by moving it to its FIGURE 3 position and thereby shutting off valve 34.

A third movable contact 53c associated with the relay 53 is normally engaged with contact 53f, but when the relay 53 is energized (i.e., in the condition shown in FIG. 3), the movable contact 53c closes with its associated fixed contact 53g. This enables the current to flow from the voltage source V through the contact 52a of the coin switch 52 and through the contacts 53c and 53g. From here, current flows through the contact 56a of switch 56. The switch 56 is maintained in its FIGURE 3 position by virtue of the cam 49a provided as part of the brew motor 49 which is now in the "rest" or "ready" condition. Still following the flow of current through switch 52, relay contact 53c, and switch 56, current then flows through the normally closed contacts 54a and 54d (deenergized position) of vend relay 54, and thence through the coil 50. The coil 50 is associated with a coin return or coin reject mechanism (not shown), and when the coil 50 is not energized, a coin inserted into the vending machine is ineffective to start the vending cycle. It will be appreciated that this is a conventional expedient and it may assume a variety of forms well known to those skilled in the art so that it is believed that additional details of operation need not be given here. Thus, during the filling of storage chamber 31, the relay contact 53c must be open or engaged with contact 53f and a coin inserted into the vending machine will be rejected because coil 50 is not energized.

During this same "ready" condition, the relay 54 is not energized inasmuch as the coin switch 52 is positioned as shown, i.e., coupled to contact 52a. Introduction of a coin changes the position of switch 52 to establish a path for current flow through contact 52b.

The relay 54 is equipped with three movable contacts 54a, 54b and 54c, of which 54b and 54c are of the normally open variety and 54a is normally closed, this last contact having been referred to just previously. When relay 50 is energized contact 54b is connected through fixed contact 54e in series with the switch 57 operated by motor cam 49b, and with the brew motor 49 itself through contact 57a. This serves to actuate the motor 49 for a manipulation of the various closures, hopper, etc., when a vending cycle is initiated. Contact 54c of relay 54 is connected via fixed contact 54f in series with the coil of relay 54 and the contact 58a of switch 58 (which is held in a closed position by the cam 49c when the brewer is in "rest" position), causing relay 54 to stay "locked in" once it is energized.

Upon the introduction of a coin into the vending machine, the switch 52 is closed momentarily. The closing of switch 52 energizes the relay 54 closing contacts 54b with 54e and 54c with 54f, and opening contact 54a. The closing of contact 54b results in actuation of the brew motor 49, which is provided as part of the manipulating mechanism 19 in the following manner. Current flows from the voltage source V through contact 54b, through the contact 57a of cam-operated switch 57, and through the brew motor 49. The switch 57 is a cam-operated switch. When the brew motor has rotated a few degrees, the cam action causes switch 57 to change position to engage contact 57b, thereby keeping the brew motor energized through the contact 57b (held in engaged position by the cam 49b) of switch 57. The brew motor will continue to rotate 180°, at which time switch 59 will change position from contact 59a under the influence of cam 49d—thereby breaking the flow of current to the brew motor and causing it to stop.

Meanwhile the closure of the contact 54c with contact 54f has caused relay 54 to remain energized until the brew motor cam 49c has rotated substantially 90° counterclockwise from its position shown in FIGURE 3 causing switch 58 operated by cam 49c to change its position to engage open contact 58b, breaking the flow of current to relay 54, thereby allowing relay 54 to return to its normal position. At the same time switch 58, by engaging open contact 58b, also breaks the flow of current to the three-way valve 42 causing valve 42 to communicate branch conduits 41 and 44.

Upon initial actuation of the brew motor 49, the lower closure 21 of the brew chamber 20 is closed, the upper closure 22 having previously been moved to the open condition and the funnel 24 vertically oriented as shown in broken line in FIG. 1. The actuation of the brew motor 49 causes the hopper 11 to dispense a predetermined amount of fresh coffee particles into the brew chamber 20, after which the funnel 24 is pivoted to the solid line condition of FIG. 1 and the top closure 22 closed. As stated above, the brew motor will stop after it has rotated 180°.

When the brew motor cam 49a has rotated substantially 180° from its FIGURE 3 position, the cam-operated switch 56 will change position, engaging contact 56b which energizes the compressor 38 and opens the valve 40 so that the compressed air from the compressor 38 flows through the branch conduits 37 and 36 into the water storage chamber 31. Since the valve 40 is now open, the pressure within the chamber 31 forces heated water upwardly through the branch conduit 32 through the valve 40 and the branch conduit 39 into the brewing chamber 20. As stated before, the three-way valve 42 has operated to communicate branch conduits 41 and 44 so that the water entering the enclosure 10 through the conduit 39 can exit therefrom through the conduit 41 past valve 42 and ultimately with the extracted coffee be discharged into the cup 46.

The flow of water (ultimately coffee), as just described, persists until the liquid level 55 falls to the level designated 55a in FIG. 3. This phenomenon signals the end of the brewing cycle and immediately deenergizes the relay 53, there then being no completed circuit to ground through the casing of the storage chamber 31. Upon deenergization of the relay 53, the contact 53c reverts to its normal condition engaged with contact 53f, which causes current to flow through contacts 59b and 57b (cams being at 180° position from shown) to brew motor 49, causing the brew motor to rotate 180° and stop upon the disengagement of contact 57b by operation of switch 57. During the second 180° rotation, the bottom closure 21 is opened and, with valve 42 positioned to communicate branch conduits 36a and 41, the air from compressor 38 purges the conduit 41 of residual liquid and the brew chamber 20 of coffee grounds, as will be explained in detail hereinbelow.

The disengagement of switch 56 with the contact 56b results in stopping the compressor 38 and closing valve 40, thus stopping the flow of water through the conduits 32 and 39 to the brew chamber. Thus, air under pressure is confined in conduits 37 and 36a between compressor 38 and valve 42 as well as in conduit 36 and chamber 31 between the compressor and the water trapped in conduit 32, between chamber 31 and the closed valve 40. Thereafter, as can be appreciated from the contours of cams 49a and 49c, the engagement of switch 58 with the contact 58a changes the condition of the valve 42 from that shown in FIG. 2 to where the compressor 38 is connected to the top of the brew chamber 20, this being achieved through branch conduit 37, branch conduit 36a (see FIG. 2), valve 42 and conduit 41. Here it will be appreciated that the top closure 22 is equipped with an upstanding nipple 22a (see FIG. 1) for the connection thereto of the conduit 41, which may include a length of flexible tubing. In the same fashion, the lower closure 21 is equipped with a nipple 21a for coupling thereto of the branch conduit 39.

With the reorientation of the valve element 43 of the three-way valve 42, air from the compressor 38 now enters the top closure 22 and is effective to purge the finely divided grounds from the screen (not shown) located therein. The screen in the top closure 22 is analogous to the screen 21b provided in the bottom closure 21 and which is seen in fragmentary detail in FIG. 1. It will be appreciated that a separate valved line from the compressor may be employed to flush the bottom lid 21.

During this operational sequence, as pointed out above, the lower closure 21 is open so that the grounds adhering or occluding to the screen in the upper closure 22 are effectively flushed away and through the now opened trap door 18 into a removable receiver 18a (see FIG. 1). In this connection, it will be appreciated that some residual liquid will remain in the conduit 41 at the close of the brewing cycle and the compressed air from the compressor 38 is therefore effective to first force this residual liquid through the brew chamber 20. Thus, the storage chamber 31 is adapted to dispense each vending cycle an amount of water slightly in excess of a cup, the ordinary cup comprising about 160 cc. Depending upon the length and orientation of the conduit 41, there may be provided each vending cycle an amount of water of the order of 180 cc. issuing from the storage chamber 31.

The sequential purging by liquid and air provides a felicitous combination in materially removing occluded spent particles of coffee from the screen in the upper closure 22. Here it will be appreciated that the liquid initially forced downwardly through the brew chamber 20 during this purging cycle is essentially waste liquid, since it represents the last water passing through the already-extracted coffee particles and which is therefore substantially ineffective to extract any of the coffee flavor.

Once the purging step has been completed, the conduit system is at atmospheric pressure. This facilitates the refilling of the storage chamber 31. The conduit to atmosphere from the chamber 31 includes the conduits 36, 36a and 41, along with the valve 42 shifted to its alternate position from the condition thereof shown in FIG. 2 and chamber 10 which is vented to atmosphere.

As pointed out previously, the valve 34 is opened by virtue of the contact 53b reverting to its normally closed condition, and this permits the introduction of heated water into the storage chamber 31 under the influence of pressure exerted by the elevated reservoir 27. Meanwhile, the brew motor 49 is completing its second 180° rotation and through the linkage system 60 (see FIG. 1) closes the trap door 18.

The linkage system 60 includes members 61 and 62 which are pivotally interconnected with the member 62 being pivotally interconnected to a lug 63 upstanding from the trap door 18. A coiled spring 64 is interconnected between the enclosure 10 and the pivotal interconnection 65 between member 62 and lug 63 which tends to maintain the door 18 in a closed condition. The linkage member 61 is pivotally mounted as at 61a on the enclosure 10 and affords a portion 66 thereof to act as a cam follower bearing against a cam 68 attached to the shaft 67 of the brew motor 49. The cam roller 68a of the cam 68 is operative to engage the upper end of the linkage member 61 to open the door 18 in order to discharge spent coffee grounds from the brew chamber 20. Again dotted and full line representations of the linkage element 61 designate the different conditions thereof in the course of operation of the brewing apparatus.

The means provided in the illustration given for opening and closing the top and bottom closures 22 and 21, respectively, includes a cam 69 affixed to the motor shaft 67. Thus, as the shaft 67 is rotated, the cam 69 is also rotated. As can be seen in FIG. 1, the bottom closure 21 is mounted on an arm 70 which is pivotally mounted in the enclosure 10 as at 71. The bottom closure 21 is carried at one end of the arm 70, while the other end of the arm 70 is pivotally connected to a spring 72 as at 73.

An arm similar to arm 70 is provided for the top closure and is designated by the numeral 74. The upper end of spring 72 is connected to one end of the arm 74 as at 75. The arm 74 is pivotally mounted within the enclosure as at 76. Each arm 70 and 74 carries a cam follower roller (77 in the case of arm 70 and 78 in the case of arm 74) which bears against the cam 69 and operates to position the top and bottom closures 22 and 21 in an open or closed position, depending upon the position of the cam contacted by the roller. For example, in FIG. 1, the cam follower roller 77 associated with the lower closure arm 70 is in contact with a depressed portion of the cam 69 so that the bottom closure 21 is open, and this is shown by the solid line condition of the lower closure 21. Correspondingly, the upper arm cam follower roller 78 is shown bearing against the portion of the cam that urges the top closure 22 into a closed and sealing relationship with the casing 23 of the brewing chamber 20. As the cam 69 rotates (the rotation being clockwise, as seen in FIG. 1), it is to be appreciated that first the bottom closure is opened and thereafter the top closure is opened, but that at certain positions of the cam 69, both closures are in a closed position. During the closing of the bottom closure, the top closure is being opened due to the peripheral contour of the cam shown, and it is this condition which exists at the time a coin is inserted into the coin mechanism of the vending machine (not shown). However, the configuration of elements seen in FIG. 1 corresponds to that immediately following the brewing cycle when the lower closure 21 is opened for the purging step.

Also pivotally mounted within the enclosure 10 is the spout or funnel 24. The spout 24 can be vertically aligned between the top opening 12 and the chamber 20. Thus, ground coffee being delivered through the funnel 13 is confined within the spout 24 in its downward path into the chamber 20 and any tendency of the ground coffee to spread out or spray is inhibited. Here, it is to be appreciated that the conservation of the ground coffee being delivered by the hopper to the brewing chamber is important, inasmuch as only about one-quarter ounce of coffee is delivered at a time—that quantity being all that is necessary for the brewing of a single cup quantity of liquid coffee.

Pivoting of the spout 24 from the solid line position to the dotted line position in FIG. 1 is effected by the movement of the top closure 22 from the solid line position to the dotted line position, and specifically through the action of an extension member 79 which is interconnected to the spout 24 and the enclosure 10 by means of a spring 80 and 81, respectively. The foregoing apparatus has been described in some detail to acquaint those practitioners in the art with the mode of operation of the overall apparatus disclosed herein. Further details of the construction and operation of the various elements within the enclosure 10 may be derived from a consideration of my previous Patent No. 2,931,288, issued April 5, 1960.

Also described in the above-mentioned patent and which finds advantageous application here, is the provision in the lower closure 21 of a baffle element 82 which is substantially coextensive with the screen 21b within the closure 21 and serves to divert hot water flowing into the chamber 20 and thus prevent channeling. Additionally, the baffle 82 cooperates with the screen 21b during the purging operation to serve as a splash plate so that liquid and air impinging thereon also cleanse the lower closure 21.

The apparatus herein described makes for an advantageous operation in the brewing of single cup quantities of coffee. The problems of non-uniformity of quality from cup to cup and considerable elapse of time between subsequent cups have been solved. Additionally, a compact and advantageous hot water storage unit is provided. It will be appreciated that because of the very small quantity of water to be dispensed each cycle, that even a small variation in the amount is intolerable. For example, the allowable variation in volume is about ±5 cc. With the arrangement of the storage chamber 31 within the tank 25, cup quantities within this tolerable variation can be achieved. However, discharging water from a larger tank directly into the brewing chamber would not permit operation within these small limits, since the entrained or occluded air would permit excessive compressibility of the water. Further, the "breathing" of the larger tank because of temperature differentials would more than exceed the allowable variation. These effects can be more fully appreciated when the ordinary tank 25 is understood to have a volume of the order of six gallons, while a cup quantity of coffee runs about five and one-third ounces (approximately 30 cc. per ounce). Thus, the permissible variation is plus or minus one-sixth ounce, and this would be readily exceeded except for the interposition of the storage chamber 31. In the illustration given, the storage chamber 31 may be a stainless steel, closed-ended cylindrical tube having an outside diameter of 2½" with a 5" length, a convenient wall thickness being 0.062".

While in the foregoing specification I have set forth a detailed description of an embodiment of the invention for the purpose of illustration thereof, many variations in the details herein given may be made by those skilled in the art without departing from the spirit and scope of the invention.

I claim:

1. In coffee brewing apparatus adapted to brew single cup quantities, a frame, a brew chamber mounted on said frame and equipped with an inlet and outlet, a water storage chamber on said frame, means on said frame for maintaining water in said storage chamber at an elevated temperature, conduit means coupling the bottom of said storage chamber with said brew chamber inlet, means on said frame for introducing a pressurized gas into said storage chamber to force water therefrom through said conduit means into said brew chamber, and additional means for introducing said pressurized gas into said brew chamber outlet.

2. In coffee brewing apparatus adapted to brew single cup quantities, a frame, a brew chamber mounted on said frame and equipped with an inlet and outlet, a water storage chamber on said frame, means on said frame for maintaining water in said storage chamber at an elevated temperature, conduit means coupling said storage chamber with said brew chamber inlet, means on said frame for introducing a pressurized gas into said storage chamber to force water therefrom through said conduit means into said brew chamber, additional means for periodically introducing said pressurized gas into said brew chamber via said outlet, and means for controlling said introducing means.

3. In coffee brewing apparatus adapted to brew single cup quantities, a frame, a brew chamber mounted on said frame and equipped with an inlet and outlet, a water storage chamber on said frame, means on said frame for maintaining water in said storage chamber at an elevated temperature, conduit means coupling the bottom of said storage chamber with said brew chamber inlet, means on said frame for introducing a pressurized gas into said storage chamber to force water therefrom through said conduit means into said brew chamber, means in said storage chamber responsive to the water level therein for controlling said introducing means, and valve-equipped conduit means coupling said introducing means with the said brew chamber outlet.

4. In coffee brewing apparatus adapted to brew single cup quantities, a frame, a brew chamber mounted on said frame and equipped with an inlet and outlet, a water storage chamber on said frame, means on said frame for maintaining water in said storage chamber at an elevated temperature, conduit means coupling the bottom of said storage chamber with said brew chamber inlet, means on said frame for introducing a pressurized gas into said storage chamber to force water therefrom through said conduit means into said brew chamber, an insulated water tank about said storage chamber, means for introducing water into said tank and means for heating said water to elevated temperature whereby said tank and heating means provide said maintaining means, valve-equipped conduit means coupling said tank and chamber, and additional valve-equipped conduit means coupling said gas introducing means with said brew chamber outlet.

5. In coffee brewing apparatus, a frame, a brew chamber on said frame and equipped with a liquid inlet in the lower portion thereof and a liquid outlet in the upper portion thereof, means in said frame for introducing sequentially single cup quantities of solid coffee into said chamber, a water storage chamber on said frame having a capacity slightly in excess of a single cup, valve equipped conduit means coupling the lower portion of said storage chamber with said liquid inlet, means for internally pressurizing said storage chamber to direct water through said conduit means, means for maintaining water in said storage chamber at an elevated temperature, valve equipped conduit means coupling said internally pressurizing means with said liquid outlet, and means for oppositely controlling the valves of said conduit means.

6. In apparatus for sequentially brewing single cup quantities of coffee, a frame, a brewing chamber mounted on said frame and equipped with openable top and bottom closures, passage providing means in each of said closures, a coffee hopper on said frame above said chamber adapted to discharge fresh coffee particles into said chamber through said top closure when the same is open, a spent particle receiver on said frame below said chamber adapted to receive spent particles from said chamber, means on said frame for selectively positioning said closures, a water storage chamber on said frame having a volume of slightly in excess of a cup quantity, means on said frame for introducing water into said storage chamber and maintaining the same at a temperature just below boiling, valve equipped conduit means coupling the lower interior of said storage chamber with the passage providing means of said bottom closure, means on said frame for internally pressurizing said storage chamber to force water through said conduit means into said brew chamber, valve equipped conduit means coupling said pressurizing means with the passage providing means of said top closure, and means for closing the valve of the first-mentioned conduit means and opening said botom closure while said top closure is closed and said pressurizing means is operative whereby said pressurizing means first impels extracting water through coffee particles in one direction of flow and thereafter purges said brew chamber by pressure fluid flow in the opposite direction.

7. In apparatus for sequentially brewing single cup quantities of coffee, a frame, a brewing chamber mounted on said frame and equipped with openable top and bottom closures, passage providing means in each of said closures, a coffee hopper on said frame above said chamber adapted to discharge fresh coffee particles into said chamber through said top closure when the same is open, a spent particle receiver on said frame below said chamber adapted to receive spent particles from said chamber, means on said frame for selectively positioning said closures, a water storage chamber on said frame having a volume of slightly in excess of a cup quantity, means on said frame for introducing water into said storage chamber and maintaining the same at a temperature just below boiling, valve equipped conduit means coupling the lower interior of said storage chamber with the passage providing means of said bottom closure, means on said frame for internally pressurizing said storage chamber to force water through said conduit means into said brew chamber, valve equipped conduit means coupling said pressurizing means with the passage providing means of said top closure, and electro-mechanical means for controlling said valves, pressurizing means and positioning means to first flow water from said storage chamber upwardly through said brew chamber and thereafter flow pressure fluid downwardly through said brew chamber.

8. The structure of claim 7 in which said storage chamber is supported within an insulated tank, means in said tank for heating water contained therein, valve equipped conduit means communicating the interiors of said tank and storage chamber, said electro-mechanical means being operative to open the valve in the last-mentioned conduit means to achieve water flow from said tank to said storage chamber after downward flow of said pressure fluid.

9. The structure of claim 8 in which said storage chamber is equipped with vertically spaced apart liquid level sensing elements operatively connected to said electro-mechanical means, the lower of said sensing elements being operative to signal said electro-mechanical means for changing the condition of the valves in each of said conduit means.

10. The structure of claim 9 in which the upper of said sensing elements is operative to signal said electro-mechanical means for changing the condition of the valve in said last-mentioned conduit means.

11. The structure of claim 10 in which said frame is equipped with coin insertion actuated switch means operative to change the condition of the valves in the conduit means coupling said storage and brew chambers and coupling said pressurizing means with said brew chamber.

12. In apparatus for sequentially brewing single cup quantities of coffee, a frame, a brewing chamber mounted on said frame and equipped with openable top and bottom closures, a flow port in each closure, a first conduit coupled with the top closure flow port and adapted to dispense liquid coffee from said flow port into a cup, screen means in said top closure in the path of the fluid passing through the flow port thereof, a coffee hopper on said frame above said brew chamber and adapted to discharge fresh coffee particles into said brew chamber, means on said frame for positioning said closures in open and closed positions, a water storage chamber on said frame, means for maintaining the water in said storage chamber at an elevated temperature, a second conduit communicating the lower interior of said storage chamber with the lower closure flow port, a source of compressed air on said frame, means communicating said source with said storage chamber, a third conduit communicating said source with the first-mentioned conduit, and electromechanical means operatively connected to said conduits and positioning means for sequentially flowing water upwardly through said screen means when said closures are closed and flowing pressure fluid downwardly through said screen means when said top closure is closed and said bottom closure is opened.

13. The structure of claim 12 in which said first conduit is equipped with a three-way valve, said third conduit being coupled to said valve, said second conduit being equipped with an on-off valve, said electro-mechanical means being operative to position said three-way valve for communicating said source and brew chamber after said on-off valve is positioned in closed position.

14. In apparatus for sequentially brewing single cup quantities of coffee, a frame, a brew chamber on said frame, a pair of closures on said chamber, each equipped with a flow port, means on said frame for positioning said closures in open and closed positions, means for introducing fresh coffee particles into said brew chamber, cup holder means on said frame, discharge conduit means communicating between one of said ports and said cup holder means, a source of heated water on said frame, means for introducing pressurized gas to said source and said discharge conduit means, inlet conduit means coupling the other of said ports with said source, and means including valve means coupled to said conduit means for sequentially causing said pressurized gas to first force water from said source through said inlet conduit means and brew chamber to brew liquid coffee from the said particles and discharge the same into a cup on said holder means and thereafter to purge said discharge conduit means and said brew chamber of residual liquid.

15. In apparatus for brewing coffee, a brew chamber, having inlet and outlet means, means for introducing fresh coffee particles into said brew chamber, a source of heated water, a source of pressurized gas, first conduit means coupling said source of pressurized gas with said source of heated water and the latter with the inlet means on said brew chamber, second conduit means coupling said source of pressurized gas with the outlet means on said brew chamber, valve means in each of said conduit means, and means for operating said valve means in preselected sequence first to cause said pressurized gas to force water through said inlet means and said brew chamber to brew liquid coffee from said coffee particles and discharge the same through said outlet means and thereafter to cause said pressurized gas to flow through said outlet means and brew chamber to purge the same of residual liquid and coffee.

16. The combination as set forth in claim 15, including screen means mounted in said brew chamber for confining the coffee particles therein and preventing the same from escaping through said outlet means, the positioning of said screen means being such that the same is adapted to be purged of residual coffee particles by said pressurized gas and residual liquid.

References Cited in the file of this patent
UNITED STATES PATENTS

| | | |
|---|---|---|
| 2,786,408 | Herrera | Mar. 26, 1957 |
| 2,887,038 | Rosander | May 19, 1959 |
| 2,931,288 | Totten | Apr. 5, 1960 |